(12) United States Patent
Vong et al.

(10) Patent No.: US 11,727,193 B2
(45) Date of Patent: Aug. 15, 2023

(54) SYSTEMS AND METHODS FOR APPLYING EFFECTS TO DESIGN ELEMENTS

(71) Applicant: Canva Pty Ltd, Surry Hills (AU)

(72) Inventors: Declan Robin Vong, Sydney (AU); Matthew David Anderson, Sydney (AU); Jesse James Walker, Sydney (AU); Michael Hebron, Sacramento, CA (US)

(73) Assignee: CANVA PTY LTD, Surry Hills (AU)

( * ) Notice: Subject to any disclaimer, the term of this patent is extended or adjusted under 35 U.S.C. 154(b) by 24 days.

(21) Appl. No.: 17/511,236

(22) Filed: Oct. 26, 2021

(65) Prior Publication Data
US 2022/0129619 A1  Apr. 28, 2022

Related U.S. Application Data

(60) Provisional application No. 63/106,073, filed on Oct. 27, 2020.

(51) Int. Cl.
| | |
|---|---|
| *G06F 40/109* | (2020.01) |
| *G06F 40/106* | (2020.01) |
| *G06F 40/151* | (2020.01) |
| *G06F 3/04847* | (2022.01) |
| *G06F 3/0486* | (2013.01) |

(52) U.S. Cl.
CPC .......... *G06F 40/109* (2020.01); *G06F 3/0486* (2013.01); *G06F 3/04847* (2013.01); *G06F 40/106* (2020.01); *G06F 40/151* (2020.01)

(58) Field of Classification Search
None
See application file for complete search history.

(56) References Cited

U.S. PATENT DOCUMENTS

| | | | |
|---|---|---|---|
| 2005/0168778 A1* | 8/2005 | Abe .................. | G06T 11/60 358/1.18 |
| 2008/0198162 A1* | 8/2008 | Ni .................. | G01C 21/3673 345/442 |

(Continued)

OTHER PUBLICATIONS

Developintelligence Llc: "How to Make Circular/Curved Text with JavaScript", Sep. 2016 (Sep. 2016), XP55900243, Retrieved from the Internet: URL:www.developintelligence.com/blog/2016/09/how-to-make-circularcurved-text-with-javascript/ (retrieved on Mar. 11, 2022).

(Continued)

*Primary Examiner* — Jeffrey J Chow
(74) *Attorney, Agent, or Firm* — GrowIP Law Group LLC

(57) ABSTRACT

Described herein is a computer implemented method. The method comprises detecting initiation of a curved text effect in respect of a selected text string of a design; determining a radius; processing the selected text string to split the selected text string into one or more text string elements, each text string element being associated with a glyph; calculating, for each text string element, an element transformation that includes element rotation data and element position data, the element transformation being based on the radius; and rendering each text string element by, for a given text string element, rendering the glyph that the given text string element is associated with based on the element transformation calculated for the given text string element.

19 Claims, 9 Drawing Sheets

(56) References Cited

U.S. PATENT DOCUMENTS

| | | | |
|---|---|---|---|
| 2008/0238927 A1* | 10/2008 | Mansfield | G06T 11/60 345/467 |
| 2013/0174092 A1* | 7/2013 | Li | G06F 3/0482 715/834 |
| 2014/0035926 A1* | 2/2014 | Burago | G06T 11/203 345/441 |
| 2019/0130793 A1* | 5/2019 | Hiramoto | G09B 29/003 |

OTHER PUBLICATIONS

European search report for application EP120958, dated Mar. 21, 2022.

* cited by examiner

SYSTEMS AND METHODS FOR APPLYING EFFECTS TO DESIGN ELEMENTS

CROSS-REFERENCE TO RELATED APPLICATION

This application is a U.S. Non-Provisional application that claims priority to U.S. Provisional Patent Application No. 63/106,073, filed on Oct. 27, 2020, the contents of which are expressly incorporated herein.

FIELD

The present disclosure is directed to systems and methods for applying effects to design elements.

BACKGROUND

Various computer implemented tools for creating and publishing designs or other visual content exist. Generally speaking, such tools allow users to create (for example) a page and then add design elements to that page.

Typically, a given design tool provides a vast array of different types of design elements that can be added to a page—either by being created from scratch by a user or being accessed from an element library (e.g. a library of shapes or other graphics). Furthermore, for any given element there will often be numerous attributes and parameters that can be adjusted in order to change the element's appearance one way of another.

Providing a large number of element types and, for each element type, various adjustable parameters is in many cases advantageous as it allows users to create complex and intricate designs. It can, however, introduce disadvantages. For example, with a large number of element types available, and a large number of options for manipulating those elements, a user may not know that creating a particular effect by is possible. Even if a user knows (or suspects) that creating a particular effect is possible, they may not be able to create such an effect, let alone do so in an efficient manner Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method comprising: detecting initiation of a curved text effect in respect of a selected text string of a design; determining a radius; processing the selected text string to split the selected text string into one or more text string elements, each text string element being associated with a glyph; calculating, for each text string element, an element transformation that includes element rotation data and element position data, the element transformation being based on the radius; and rendering each text string element by, for a given text string element, rendering the glyph that the given text string element is associated with based on the element transformation calculated for the given text string element.

Also described herein is a computer processing system comprising: a processing unit; a display; and a non-transitory computer-readable storage medium storing instructions, which when executed by the processing unit, cause the processing unit to: detect initiation of a curved text effect in respect of a selected text string of a design; determine a radius; process the selected text string to split the selected text string into one or more text string elements, each text string element being associated with a glyph; calculate, for each text string element, an element transformation that includes element rotation data and element position data, the element transformation being based on the radius; and render, on the display, each text string element by, for a given text string element, rendering the glyph that the given text string element is associated with based on the element transformation calculated for the given text string element.

Figure 1:
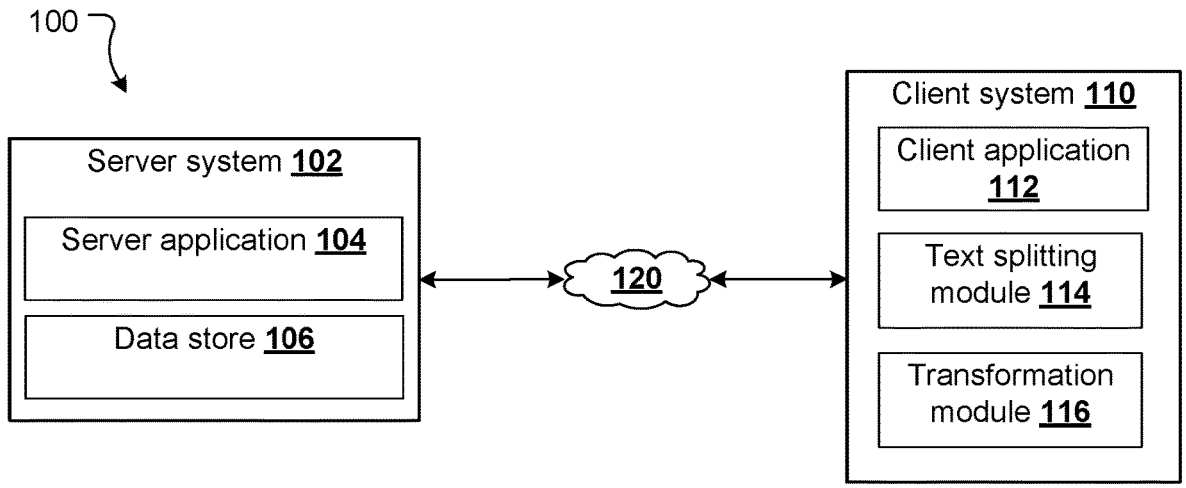
FIG. 1 depicts an example environment in which features of the present disclosure can be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

As described above, many tools for creating and publishing visual content exist. The present disclosure generally focuses on taking a text string and presenting it in a curve.

Initially, a brief overview of text is provided. Following this a networked environment and computer processing system in which features of the present disclosure can be implemented will be described. An example user interface for creating a design is described, followed by processing involved in applying and adjusting effects to selected design elements.

The present disclosure involves processing text strings. In a computing environment, text strings can be stored, communicated, and presented in various ways. In the present disclosure, a text string is a set of one or more characters. Each character of a text string is defined by character information, which in the present disclosure includes a character identifier and text attributes.

A character identifier defines what the character is—for example the letter 'a', the symbol '&', the smiley-face emoticon '☺', or any other character. A common way of identifying characters is the Unicode standard or Unicode code space, for example the Unicode Transformation Format-8 bit (UTF-8) encoding scheme. Within this scheme, characters (e.g. letters, numbers, symbols, ideographs, emojis, etc.) are identified by code points. For example, Unicode codepoint 'U+0041' is the Latin capital letter A, Unicode codepoint 'U+1F600' is a smiley face emoji/emoticon. The techniques described herein can be applied to alternative schemes/mechanisms for representing text.

Text attributes provide information on how a glyph corresponding to a particular character is displayed. These can include attributes such as font type, font size, font style (italics, bold, etc.), line height, letter spacing, and/or other attributes.

Generally speaking, a character identifier and associated attributes allow glyph display dimensions to be calculated—for example a glyph width and a glyph height. Using such dimensions the overall dimensions of a displayed text string can be calculated—e.g. linear text string length (the sum all glyph widths) and linear text string height (the maximum glyph height of all characters in the text string).

Figure 14:
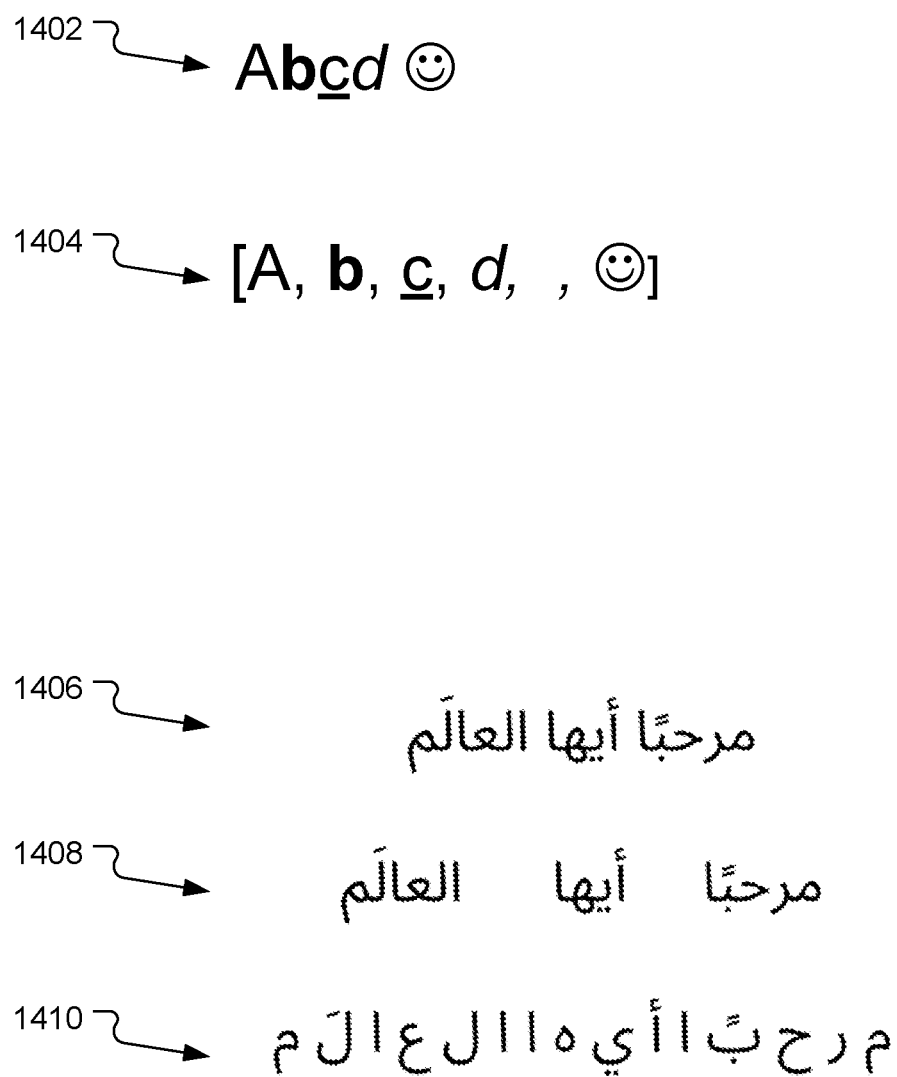
FIG. 14 provides examples of text strings.

For example, "A" is a text string including the single character 'A' (codepoint U+0041), Arial, 12 point. "Ab<u>c</u>d ☺" (see 1402 of FIG. 14) is a text string including: character 'A' (codepoint U+0041), Arial, 12 point; character 'b' (codepoint U+0062), Arial, 12 point, bold; character 'c' (codepoint U+0063), Arial, 12 point, underlined; character 'd' (codepoint U+0064), Arial, 12 point, italicised; character ' ' (i.e. a space, codepoint U+0020), Arial, 12 point; character '☺' (codepoint U+1F600), Arial, 12 point.

As described below, in present disclosure generating a curved text string involves splitting a subject text string into a set (e.g. an array) of one or more text string elements.

In certain embodiments, text string elements correspond to individual characters or explicitly defined character groups (i.e. characters explicitly combined via a combining character) of the text string. In these embodiments, and for example, the splitting text string "Ab<u>c</u>d ☺" (1402) may result in the following set of text string elements:

[A, b, <u>c</u>, d, ☺] (See 1404)

In other embodiments, individual text elements may include multiple characters (whether explicitly joined via a combining character or not). For example, text elements may be based on ligatures. For example, in this case splitting a text string such as that shown at 1406 of FIG. 14 may result in the three elements shown at 1408. This is in contrast to splitting the same text string (1406) into individual characters, which would result in the elements shown at 1410.

In this example, the elements are connected ligature groups rather than individual (or explicitly combined) characters. A connected ligature group may include multiple individual characters, even though those characters are not explicitly combined by a combining character.

Turning to FIG. 1, one example of a networked environment 100 in which the various operations and techniques described herein can be performed is provided.

Networked environment 100 includes a server system 102 and a client system 110 that are interconnected via a communications network 120 (e.g. the Internet). While a single client system 110 is illustrated and described, server system 102 will typically serve multiple client systems.

The server system 102 includes various functional components which operate together to provide server side functionality.

One component of server system 102 is a front-end server application 104. The server application 104 is executed by a computer processing system to configure the server system 102 to provide server-side functionality to one or more corresponding client applications (e.g. client application 112 described below). The server-side functionality includes operations such as user account management, login, and content creation functions—for example creating, saving, publishing, and sharing content (e.g. designs).

To provide the server-side functionality, the server application 104 comprises one or more application programs, libraries, APIs or other software elements. For example, where the client application 112 is a web browser, the server application 104 will be a web server such as Apache, IIS, nginx, GWS, or an alternative web server. Where the client application 112 is a specific application, the server application 104 will be an application server configured specifically to interact with that client application 112. Server system 102 may be provided with both web server and application server modules.

In the present example, server system 102 also includes a data store 106 which is used to store various data required by the server system 102 in the course of its operations. Such data may include, for example, user account data, design template data, design element data, and data in respect of designs that have been created by users. While one data store 106 is depicted, server system 102 may include/make use of multiple separate data stores—e.g. a user data store (storing user account details), one or more design element library data stores (storing design elements such as graphics that users can add to designs being created); a template data store (storing templates that users can use to create designs); a design data store (storing data in respect of designs that have been created); and/or other data stores.

In order to provide server side functionality to clients, server system 102 will typically include additional functional components to those illustrated and described. As one example, server system 102 will typically include one or more firewalls (and/or other network security components), load balancers (for managing access to the server application 104), and or other components.

The server system 102 components have been described as functional components, and may be implemented by hardware, software (data and computer readable instructions which are stored in memory and executed by one or more computer processing systems), and/or a combination of hardware and software.

The precise hardware architecture of server system 102 will vary depending on implementation. Server system 102 will typically include multiple computer processing systems (e.g. server computers) which communicate with one another either directly or via one or more networks, e.g. one or more LANS, WANs, or other networks (with a secure logical overlay, such as a VPN, if required).

For example, server application 104 may run on a single dedicated server computer and data store 106 may run on a separate computer (with access to appropriate data storage resources). As an alternative example, server system 102 may be a scalable system configured to commission/decommission resources (e.g. server applications 104) based on user demand 104. In this case there may be multiple server computers (nodes) running multiple server applications 104 which service clients via a load balancer.

A single server system 102 has been shown in example environment 100. In certain embodiments, additional server systems may be accessible to a client system 110 (and/or server system 102)—for example third party content servers which the client and server systems can access to obtain design elements that can be added to designs.

Client system 110 hosts a client application 112 which, when executed by the client system 110, configures the client system 110 to provide client-side functionality for/interact with the server application 104 of the server system 102. Via the client application 112, users can interact with the server application 104 in order to perform various operations such as creating, editing, saving, retrieving/accessing, publishing, and sharing designs.

Client application 112 may be a web browser application (such as Chrome, Safari, Internet Explorer, Opera, or an alternative web browser application) which accesses the server application 104 via an appropriate uniform resource locator (URL) and communicates with server application 104 via general world-wide-web protocols (e.g. http, https, ftp). Alternatively, the client application 112 may be a specific application programmed to communicate with server application 104 using defined application programming interface (API) calls.

In the present examples, client system 102 also includes a text splitting module 114 and a transformation module 116. In the embodiments described below, the text splitting module 114 and transformation module 116 perform (or configure the client application 112 to perform) processing associated with generating curved text.

Text splitting module 114 and/or transformation module 116 may be software modules such as add-ons or plug-ins that operate in conjunction with the client application 112 to expand the functionality thereof. In alternative embodiments, modules 114 and 116 may be native to the client application 112. In still further alternative embodiments, modules 114 and/or 116 may be a stand-alone applications (running on client system 110, server system 102, or an alternative server system) which communicate with the client application 112.

Client system 110 may be any computer processing system which is configured (or configurable) by hardware and/or software to offer client-side functionality. By way of example, client system 110 may be a desktop computer, a laptop computer, a netbook computer, a tablet computing device, a mobile/smart phone device, a personal digital assistant, or an alternative computer processing system.

Although not illustrated in FIG. 1, client system 110 will typically have additional applications installed thereon, for example at least an operating system application (e.g. a mobile operating system if client system is a mobile device, a desktop operating system if client system 110 is a desktop system, or an alternative operating system).

The architecture described above and illustrated in FIG. 1 is provided by way of example only. Many variations are possible.

For example, while modules 114 and 116 have been described and illustrated as being part of/installed at the client system 110, the functionality provided by modules 114 and 116 could alternatively be provided by server system 102, for example as an add-on or extension to server application 104, a separate, stand-alone server application that communicates with server application 104, or a native part of server application 104.

Further alternatively, the functionality provided by modules 114 and/or 116 could be performed by a client application (e.g. 112) and server application (e.g. 104) operating in conjunction.

As a further alternative, the functionality provided by modules 114 and/or 116 could be provided as an entirely separate service—e.g. running on a separate server system to server system 102 and communicating with client application 112 (and/or server system 102) as required to perform the effects functionality described herein.

Furthermore, while a client-server architecture has been described, a content creation system including modules 114 and/or 116 (or otherwise configured to perform the processing described herein) could be provided in a self-contained application that is installed and runs solely on a client system such as 110 without any need of a server application.

The features and techniques described herein are implemented using one or more computer processing systems.

For example, in networked environment 100 described above, client system 110 is a computer processing system (for example a personal computer, tablet/phone device, or other computer processing system). Similarly, the various functional components of server system 102 are implemented using one or more computer processing systems (e.g. server computers or other computer processing systems).

Figure 2:
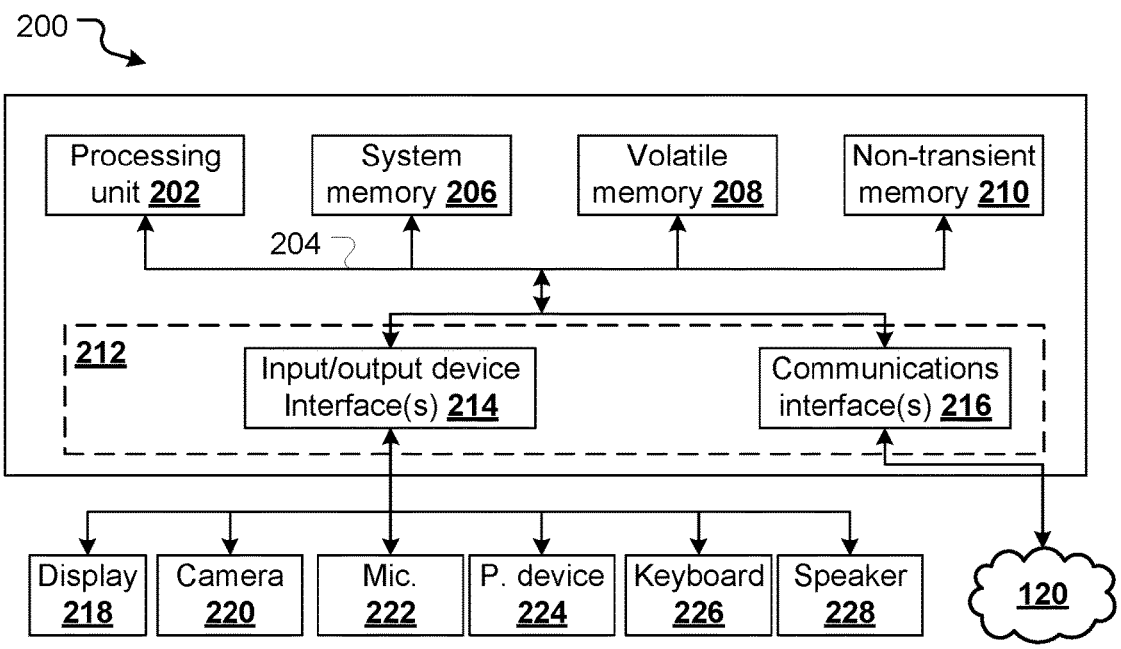
FIG. 2 is an example computer processing system configurable to perform various features described herein.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. In the present example, input/output devices interface with system 200 via one or more input/output device interfaces 214. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a display (such as a CRT, LCD, LED, plasma, touch screen, or other display), speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

By way of example, where system 200 is a client system such as 110, it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

System 200 also includes one or more communications interfaces 216 for communication with a network, such as network 120 of environment 100 (and/or a local network within the server system 102). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory machine readable medium accessible to system 200. For example, instructions and data may be stored on non-transitory memory 210. Instructions and data may be transmitted to/received by system 200 via a data signal in a transmission channel enabled (for example) by a wired or wireless network connection over an interface such as 214 or 216.

As described above, applications accessible to system 200 will typically include an operating system application.

System 200 also stores or has access to applications which, when executed by the processing unit 202, configure system 200 to perform various computer-implemented processing operations described herein. For example, and referring to the networked environment of FIG. 1 above: client system 110 includes a client application 112 which (with modules 114 and 116) configures the client system 110 to perform the operations described herein.

In some cases, part or all of a given computer-implemented method will be performed by system 200 itself, while in other cases processing may be performed by other devices in data communication with system 200.

Figure 3:
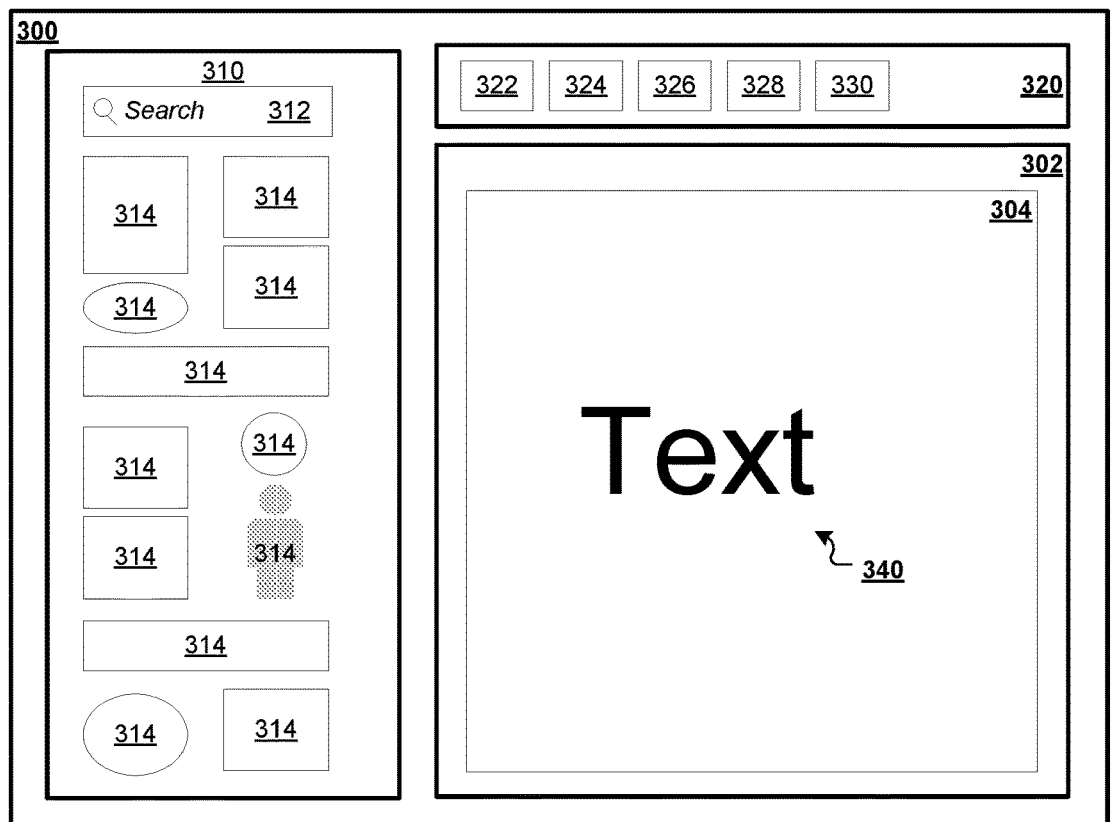
FIG. 3 provides an example design creation user interface.

As described above, the present disclosure is generally concerned with applying a curve effect to design text elements. Referring to FIG. 3, this section provides a general overview of an example user interface 300 by which a user can create a design, add design elements (such as text elements) to that design, cause effects to be applied to/removed from design elements, and adjust effects applied to design elements.

It should be noted, however, that particular manner in which a design is created and/or design elements are added to a design are not of specific relevance to this disclosure, and many alternative ways of doing so exist.

User interface 300 is displayed by a client system 102 on a display 218 thereof (the client system 102 configured to do so by client application 104).

Via interface 300 a user can create a design document that comprises one or more pages and (inter alia) add design elements to those pages. Example design creation interface 300 includes a design creation pane 302 in which the design currently being worked on is displayed. In the present example, design creation pane 302 shows a single page 304 of a design document.

Design creation interface 300 also includes a design element search and selection pane 310 via which a user can search or browse one or more design element libraries, view design element previews 314, and select design elements to be included in the design document. To this end, pane 310 includes a search box 312 (allowing a user to enter search text) and design element previews 314 providing preview images of design elements. The search functionality may cause the client application 112 to search local memory of the client system 110 for design elements, server system 120 memory for design elements, and or third party server systems (not shown) for design elements.

Design elements previewed in the search and selection pane 310 can be added to the design being worked on (e.g.

to page 304), for example by dragging and dropping, double-clicking, dwelling, or any other appropriate user interaction.

Design creation interface 300 also includes a toolbar 320 providing various tools for design creation and editing. In this particular example the tools include: a design element selection tool 322 allowing a user to select a particular design element that has been added to the page 304; a drawing tool 324 allowing a user to draw a design element having a geometric or other shape; a text tool 326 allowing a user to add a text element; an import tool 328 allowing a user to import a design element from another source (e.g. a design element stored on locally or remotely accessible memory, a design element from a third party server, etc.).

While not shown, toolbar 320 will typically be an adaptive toolbar in that the tools provided change depending on what the user is doing. For example, if a user selects the text tool 326, additional (or alternative) tools relevant to text may be displayed: e.g. a font selection tool, a font size tool, a font style tool, a font colour tool etc.

In the present example, toolbar 320 also includes an effects control 330, activation of which (in this particular example) causes an effect control interface to be displayed. An example effect control interface 400 is described below with reference to FIGS. 4 and 5.

Generally speaking, in order to create a design a user creates a page and adds design elements to that page. Design elements can be added in various ways. For example, a user can interact with the design element search and selection pane 310 to search/browse for design elements and then add design elements to the design being created—e.g. by selecting a design element preview 314, dragging it to a position on the page 304, and dropping it. Alternatively, a user may create and add an entirely new design element—e.g. by drawing a design element using a tool such as drawing tool 324 or adding custom text via text tool 326. Further alternatively, a user may import a design element via import tool 328.

In this specific example, page 304 includes a single design element 340. The example design element 340 is a text element with the letters T, e, x, and t. Text element 340 may be generated, for example, by user activation of an add text control (such as control 326), user selection of a position on the page 304 (e.g. by clicking or contacting that position), and user entry of the letters 'T', 'e', 'x', and (e.g. via a physical or GUI keyboard).

Interface 300 is provided by way of example only, and alternative user interfaces (with alternative user interface elements and controls) are possible.

Figure 4:
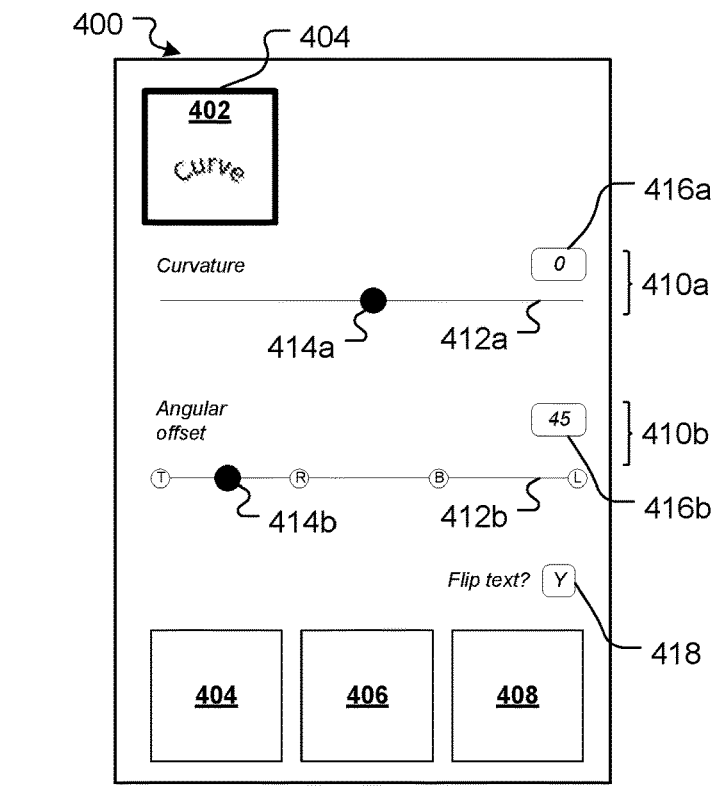
FIG. 4 provides an example effect control interface.

Turning to FIG. 4, an example effect control interface 400 will be described.

In some implementations, an effect control interface such as 400 will be displayed in response to activation of a particular user interface control (for example an effects control 330 of user interface 300). In this case, effect control interface 400 may be displayed in various ways.

For example, effect control interface 400 may replace display of the search and selection pane 310 of user interface 300. In this case, activation of a design element search control will cause the search and selection pane 310 to be redisplayed and the effect control interface 400 to be hidden.

In alternative implementations, an effect control interface such as 400 may be displayed as a floating interface which is displayed above other user interfaces elements and can be moved around by a user. In this case, the effects control 330 may be configured as a toggle control with successive activations causing an effect control interface to be displayed and hidden.

In still further alternative implementations, an effect control interface such as 400 may be permanently displayed (in which case an effects control 330 need not be provided).

Effect control interface 400 of the present example includes a plurality of effect selection controls, each associated with a particular effect. In this case four effect controls are indicated (402, 404, 406, and 408) though fewer or more may be available.

Via the effect control interface 400, a user can apply a particular effect to a selected design element or group of design elements. For example, a user may select one or more elements that have been added to the design (e.g. by clicking or contacting them on the page 304) and then activate a particular effect selection control by clicking or contacting on (or proximate) the control 402.

Relevantly, effect control interface 400 includes a curved text effect control 402. If a user has selected a text element in the design (e.g. element 340), curved text effect control 402 can be selected/activated by a user to apply a curve to the selected text as described below.

As also described below, in certain implementations the curve text effect may be associated with user adjustable parameters. In the present example, selection of the curved text effect control 402 causes parameter adjustment controls 410 for any user-adjustable parameters to be displayed.

In the present example, the user adjustable parameters for the curved text effect include curvature (which can be adjusted by a curvature adjustment control 410a), angular offset (which can be adjusted by an angular offset adjustment control 410b), and text flipping (which can be adjusted by a flip text control 418).

In this particular example, the curvature and angular offset adjustment controls 410a and 410b each include a slider control having a slider bar 412a/412b and a handle 414a/414b. A user can slide the handle 414 along the bar 412 to adjust the parameter in question. Each adjustment control 410 also includes parameter value display 416 which displays a numerical value corresponding to that selected via the slider and/or allows a numerical value to be directly entered therein.

In this particular example, the flip text control 418 is a checkbox that can either be active (e.g. selected) or inactive (e.g. deselected or not selected).

In the present example, the curvature adjustment control 410a allows a user to define a level of curvature that is to be applied to a selected text string. In the described embodiments, the client application 112 configures the curvature adjustment control 410a to allow a user to select a curvature value of between −100 and 100, the selected value then being used to calculate a radius and create the curve as discussed below. In alternative embodiments, curvature adjustment control 410a may be used to directly define a radius.

In the present example, the angular offset adjustment control 410b allows a user to define a circumferential position of the curve that is applied to the text string. In the present disclosure, angular offset is measured between 0 and 360 degrees (or 0 and +/−180 degrees), though alternatively defined offset units/positions could be used. In this case, an angular offset of 0 degrees (which is the default angular offset) defines a circumferential position in which the text is curved as if about the top midpoint of a circle (e.g. 504 below), and increasing angular offsets move the circumferential position in a clockwise direction around the circle. In this example, the slider bar 412*b* of the angular offset adjustment control 410*b* includes four pre-defined angular offset points to assist a user identifying/selecting commonly used offsets: a top ('T') offset point (equivalent to an angular offset of 0 degrees); a right ('R') offset point (equivalent to an angular offset of 90/−270 degrees); a bottom ('B') offset point (equivalent to an angular offset of 180/−180 degrees); and a left ('L') offset point (equivalent to an angular offset of 270/−90 degrees). Application 112 may be configured to initially set a default angular offset, for example 0 degrees (i.e. so the centre of the text string is at a top of a circle that is ultimately defined by the curvature value).

Figure 5:
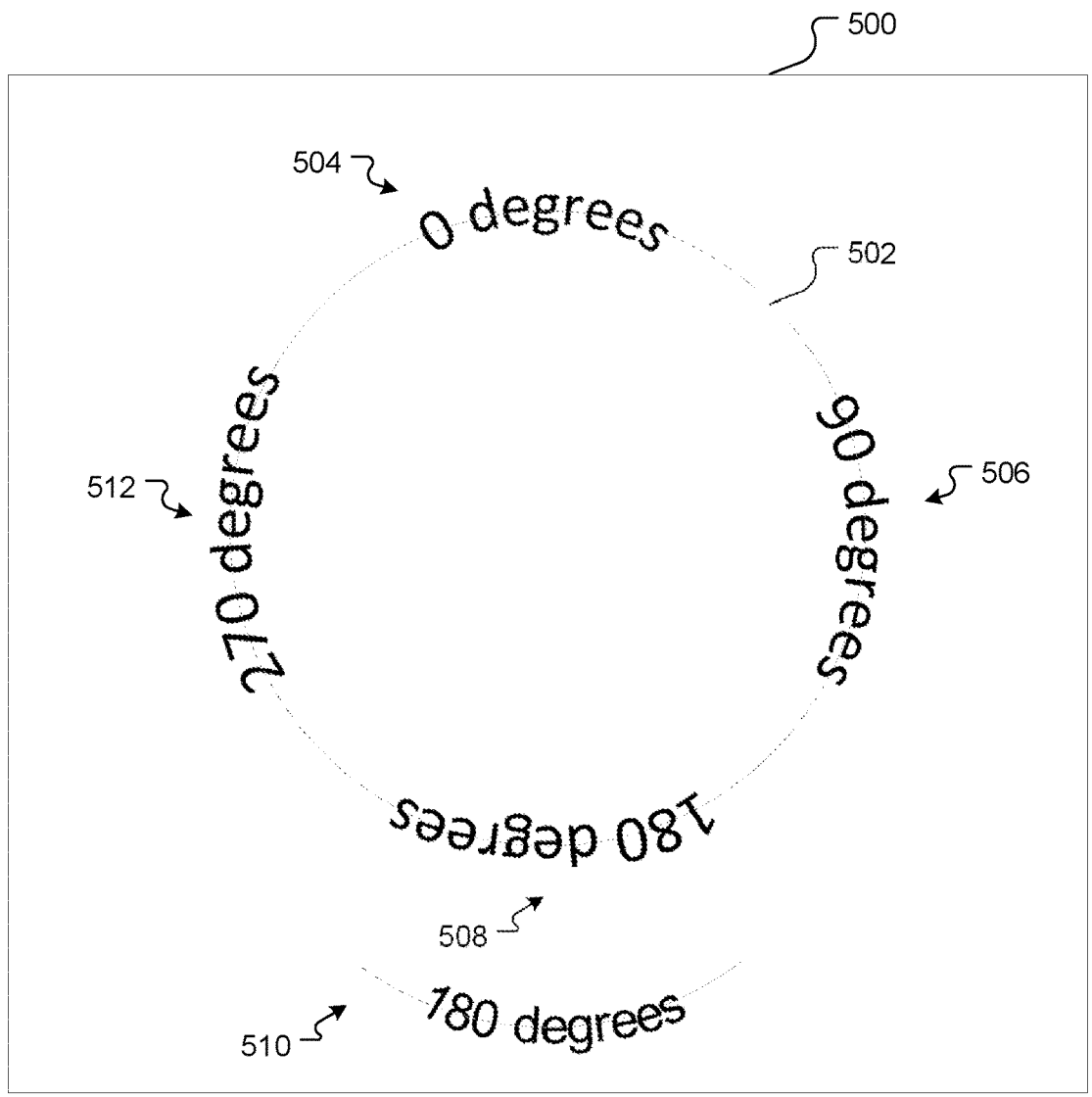
FIG. 5 provides examples of curved text.

In the present example, the flip text control 118 is used to flip the text, an example of which is shown in FIG. 5.

Referring to FIG. 5, a design 500 with text elements depicting the angular offset and flipped parameters described above is provided. Design 500 includes 5 text elements, each having a curve radius of approximately 90 mm (indicated by circle 502, which may be displayed temporarily during application/adjustment of the curved text effect but then disappear/not form part of the final design). Design 500 includes: a first curved text element 504 with an angular offset of 0 degrees and not flipped; a second curved text element 506 with an angular offset of 90 degrees and not flipped; a third curved text element 508 with an angular offset of 180 degrees and not flipped; a fourth curved text element 510 with an angular offset of 180 degrees and flipped; a fifth curved text element 512 with an angular offset of 270 degrees and not flipped.

Figure 13:
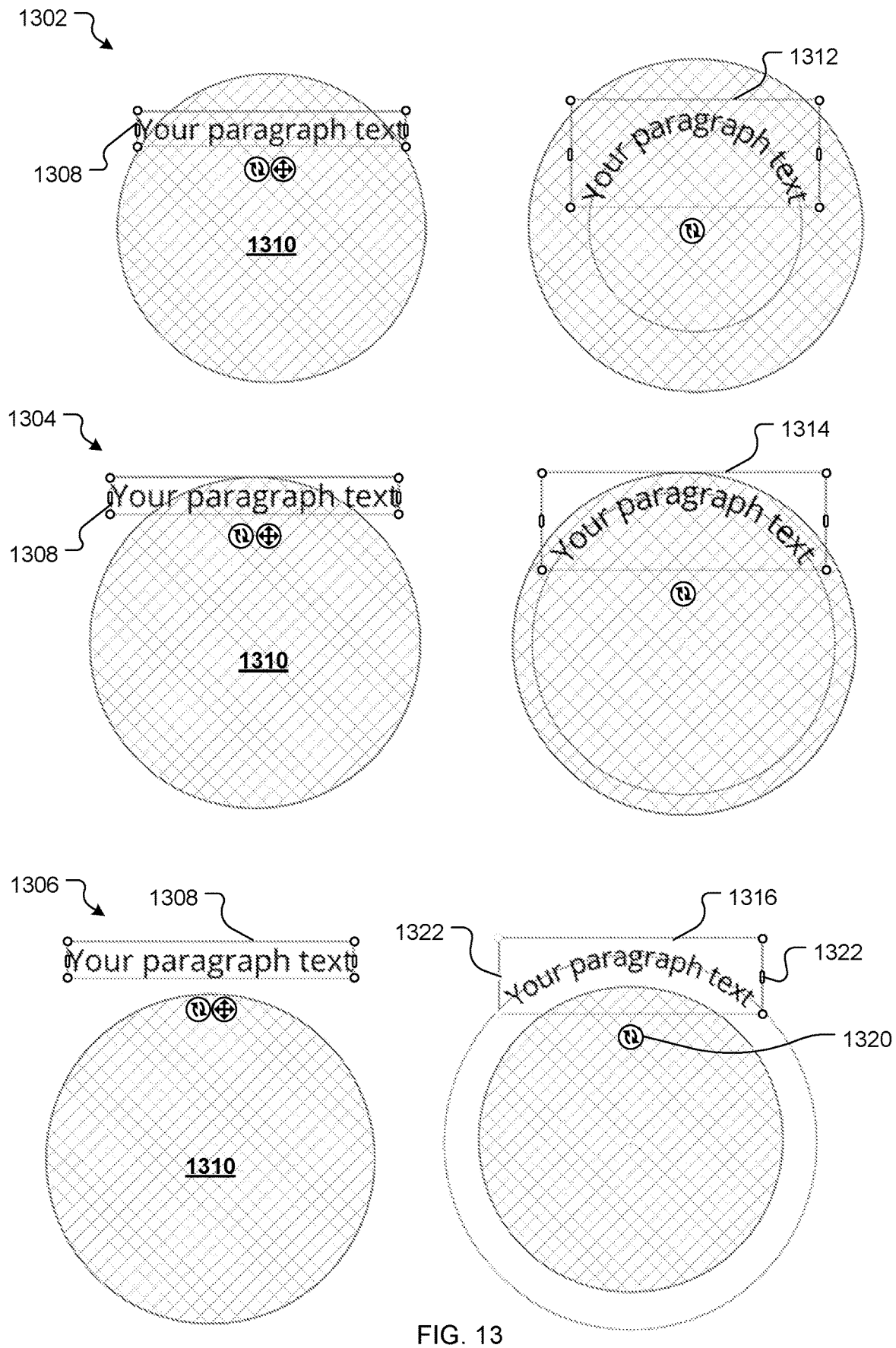

Alternative types of parameter adjustment controls may be provided. For example, parameters may additionally (or alternatively) be adjusted by pop-up controls that appear adjacent a text string being adjusted. FIG. 13 provides examples of such controls, including an angular offset control 1320 (allowing a user to rotate the curved text and thereby adjust the angular offset), and curvature handles 1322 (by which a user can expand or shrink the curvature).

Figure 6:
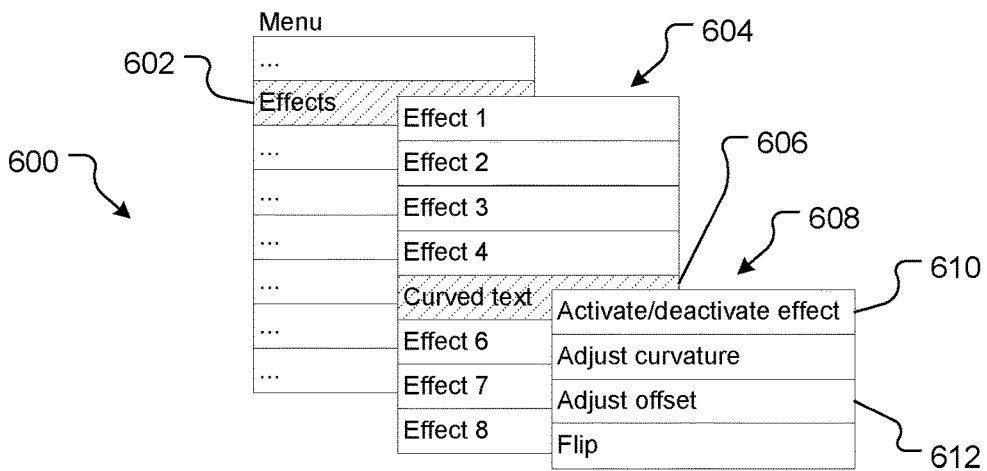
FIG. 6 provides an alternative example effect control interface.

FIG. 4 depicts a particular example of an effect control interface 400. Alternative user interface elements can, however, be provided in order to activate/deactivate the curved text effect and/or adjust effect parameters. As an alternative example, FIG. 6 depicts a user interface 600 which allows for effects to be activated/de-activated and for parameters to be adjusted via a drop-down menu mechanism.

User interface 600 includes an effects menu item 602. Effects menu item 602 is similar to effects control 330 of interface 300 above.

Activation of the effects menu item causes an effects sub-menu menu 604 to be displayed, the effects menu including effect menu items 606 for each effect that can be activated. Selection of the curved text menu item 606 causes a curved text effect sub-menu 608 to be displayed which includes: an activation/deactivation control 610 which toggles the specific effect on/off, and relevant parameter controls 612 (in this example an adjust curvature control, an adjust angular offset control, and a flip text control. Selection of the adjust curvature or adjust offset controls may cause a further parameter adjustment control to be displayed (such as a slider bar or alternative control as described above).

Processing involved in order to apply a curved text effect to a selected design text element—i.e. to a text string—will now be described.

Figure 7:
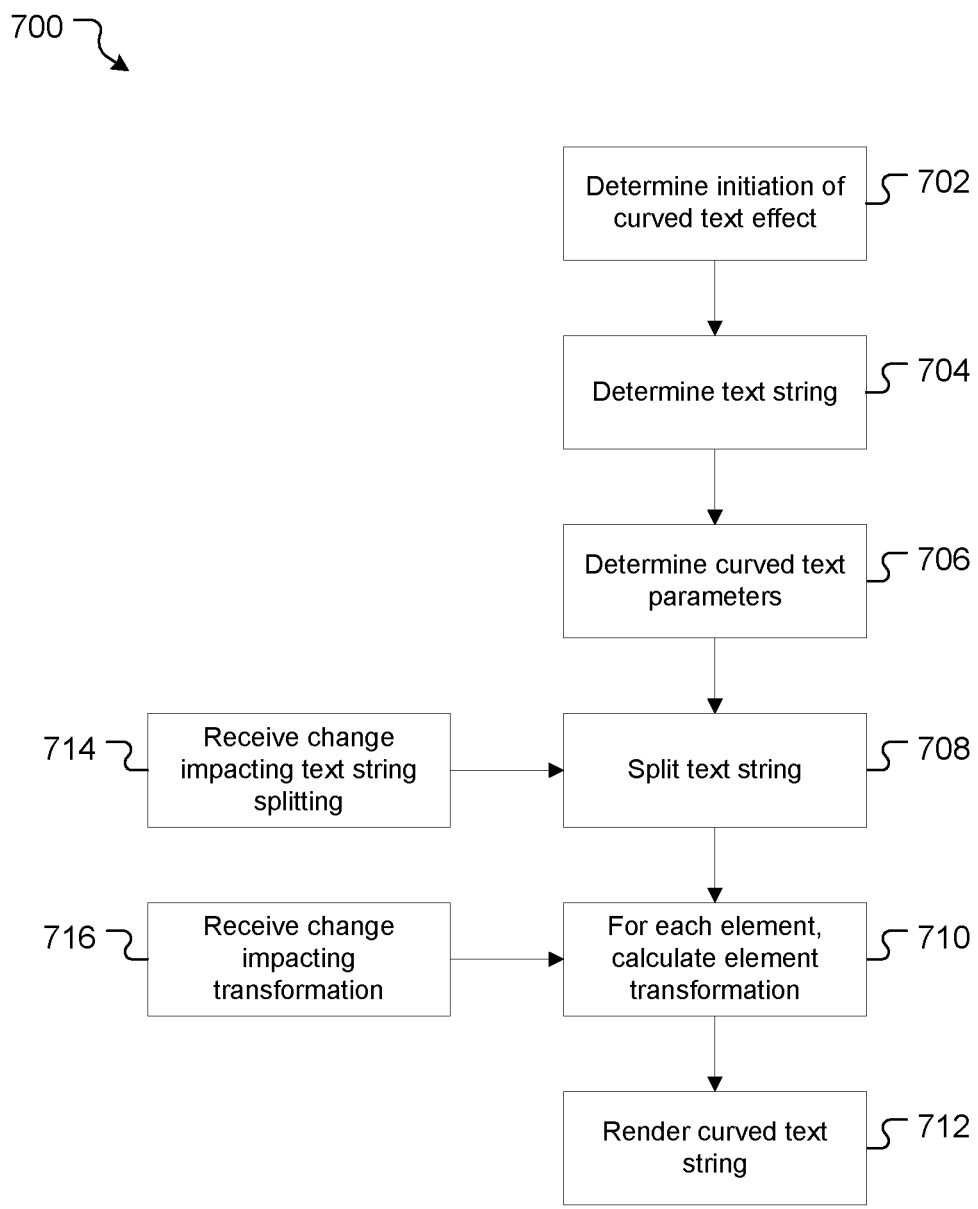
FIG. 7 is a flowchart depicting operations involved applying a curved text effect to a selected text string design element.

FIG. 7 is a flowchart depicting operations involved in selecting and applying a curved text effect to a text string.

At 702, the client application 112 determines that the curved text effect has been initiated. In the present embodiment, client application 112 determines initiation of the curved text effect based on detecting user activation of a curved text effect control such as 402 or 606 as described above.

At 704, the client application 112 determines the text string design element that the curved text effect is to be applied to. This may, for example, be a text string design element that has been selected prior to activating the curved text effect control. Alternatively, a text string design element may be selected by a user immediately after activating the curved text effect control.

At 706, the client application 112 determines curved text parameters—e.g. (and continuing with the example parameters described above) a curvature, an angular offset, and a 'flipped' parameter.

In certain embodiments, client application 112 may be configured to set initial parameter values on activation of the curved text effect control. For example, client application 112 may set: a default curvature value of 50; a default angular offset of 90 degrees (so the text is curved around the top of a circle); and a default flipped value of false (so the text is not flipped).

In certain embodiments, client application 112 may be configured to automatically calculate (or attempt to calculate) a suggested radius value based on the position of the selected text string relative to other design elements included in the design. Suggested radius value calculation is described below with reference to FIG. 11.

At 708 the text string is split into text string elements. In the present embodiment, this is handled by text splitting module 114. Each text string element is associated with (or has information that can be used to determine) a glyph—i.e. a displayed character/set of characters that takes into account character attributes such as font type, font style, font size and the like.

As described above, in certain embodiments client application 112 is configured to determine each individual character or explicitly combined character group in the text string to be a distinct text string element.

In alternative embodiments, client application 112 is configured to process the text string to determine whether any non-explicitly combined characters should be treated as a single element.

In either case, client application 112 may be configured to split the text string into text string elements by invoking a text shaping library that takes a text string as input and returns glyph indices and positions. Examples of such libraries are HarfBuzz and Allsorts.

In certain embodiments, splitting the text string at 708 generates a set (e.g. array) of text string elements which includes, for each text string element, an identifier of the character(s) of the text string element and the glyph width of the text string element. For example:

[{<Unicode code point(s)>, <glyph width>}, { . . . }, { . . . }]

At 710, element transformations are calculated for each text string element determined at 708. In the present embodiment element transformations are calculated by transformation module 116. In this case, the element transformation module is passed a set of element data in respect of each element for which a transformation is required. The set of element data passed to the transformation module may include, for example:

[<curvature>, <glyph width>, <glyph offset>, <string width>, <font size>]

In this set of element data: curvature is the curvature parameter (as set by application 112 or the user); glyph width is the width of the glyph the element relates to (e.g. in pixels, which may be calculated or returned by the text splitting process); glyph offset is the x coordinate of the start of the element's glyph in the text string (calculated, for example, by summing the widths of the preceding elements in the string); sting width is the total width of the string (calculated, for example, by summing the widths of all elements of the string); font size is the font size. Where angular offset and/or flipped are provided as parameters (as opposed, for example, to all curved text being initially created with a default offset such as 90 degrees and a default flipped value such as false) the set of element data may also include the angular offset and/or flipped parameters.

In the present embodiment, an element transformation is defined by a rotation (e.g. a value in degrees), an x-coordinate (e.g. a value in pixels), and a y-coordinate (e.g. a value in pixels). Accordingly, the transformation calculated for a given text string element may take a form such as the following:

[<rotation>, <x-coordinate>, <y-coordinate>]

Calculation of the rotation, x-coordinate, and y-coordinate values according to the present embodiment is as follows.

The input parameters are the curvature value 'c', the font size of 'f', and a linear text width of 'w'.

As described above, the curvature value in the present embodiments is a value of between −100 and 100. In this case, the input curvature value ($c_i$) is initially mapped to a mapped curvature value ($c_m$) (though this could be performed at 706 or another point in the process). This mapping is performed to make operation of the curvature slider control seem more linear to a user. The mapped curvature value in the example is calculated according to the following formula:

$$c_m = \tan(c_i)/\tan(1)$$

In alternative embodiments, mapping of the input curvature value to a mapped curvature value is not performed. In this case the following calculations may still be used, substituting references to the mapped curvature value ($c_m$) with references to the input curvature parameter ($c_i$).

A change in angle value δA is also calculated. The change in angle value is a value that indicates the change in angle per horizontal pixel of the original linear text string). In the present embodiment, the change in angle value is calculated as follows:

$$\delta A = \text{absolute}(c_m * 2) * (16/f)$$

In this formula the multiplier value of 2 can be set at different values to change the degree of curvature. A multiplier of 2 has been identified by the inventors as a value that provides aesthetically pleasing results for text strings of different lengths and sizes.

Figure 8:
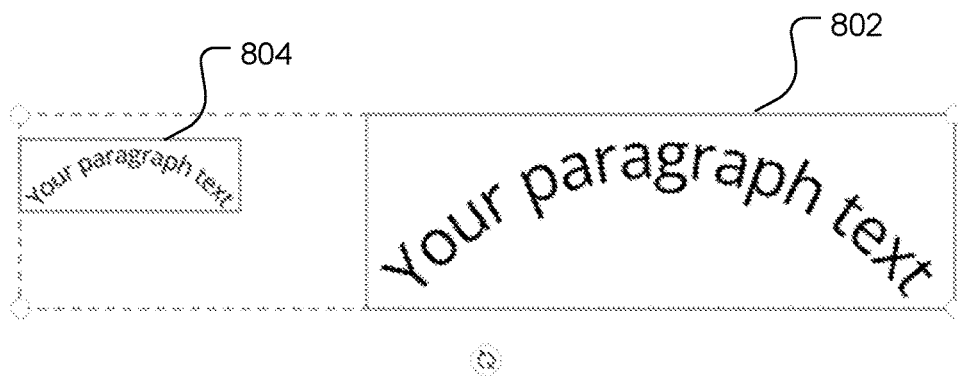
FIGS. 8, 9, 10 provide examples of curved text.

The (16/f) multiplier is included to normalize the curvature based on the font size. Accordingly, for the same curvature value c, text at (for example) font size 18 (see 802 of FIG. 8) will end up with the same curvature as text at (for example) font size 48 (see 804 of FIG. 8).

Using the change in angle value δA, a circumference can be calculated $$\text{circumference} = 360/\delta A$$

From the circumference a radius can be calculated:

$$r = \text{circumference}/(2*pi)$$

From the radius an arc angle can be calculated (the arc angle being the angle that is to be occupied by the text string once curved):

$$\text{arc} = 360*(w/\text{circumference})$$

Figure 9:
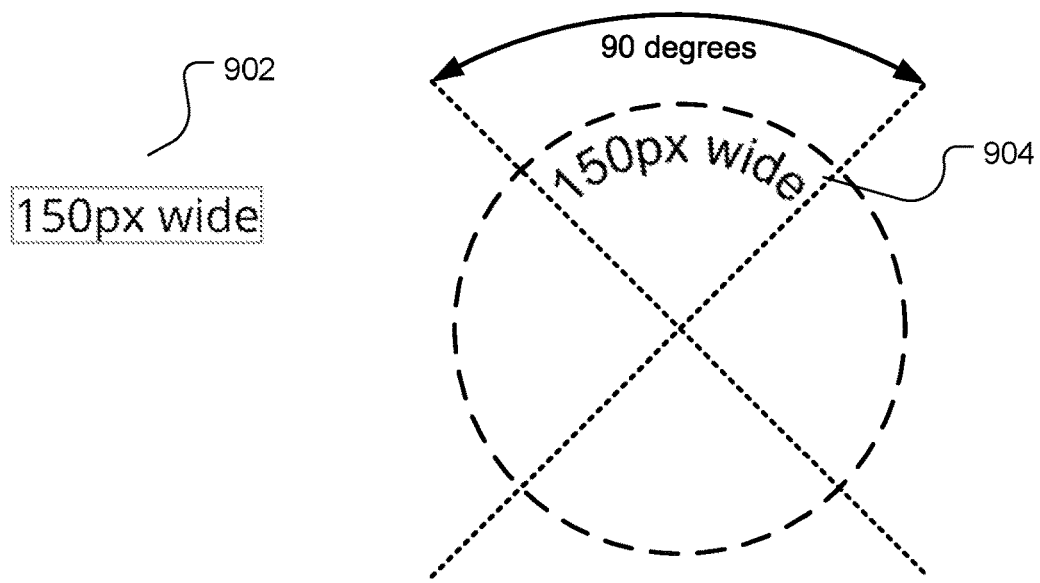

To illustrate these calculations, consider the example linear text 902 in FIG. 9 (not to scale): '150 px wide'. In this example, assume the mapped curvature $c_m$=0.3, font size f=16 and text string width w=150 px. In this case:

$$\delta A = \text{absolute}(0.3*2)*(16/16) = 0.6$$

$$\text{circumference} = 360/0.6 = 600px$$

$$\text{radius} = 600/(2*pi) = 95.48px$$

$$\text{arc} = 360*150/600 = 90 \text{ degrees}$$

Accordingly, the linear text string 902 will occupy 90 degrees (or a quarter) of a circle once curved (see 904).

If the calculated arc angle is greater than 360 degrees, the client application 112 determines that the text string is too long for the curvature. Client application 112 may be configured to respond to this determination in various ways.

For example, in certain embodiments client application 112 is configured to generate and display a 'text string too long' error message and cease processing until (or if) a new curvature value is selected.

In alternative embodiments, client application 112 is configured to attempt to automatically increase the curvature value so the text string is not too long (e.g. so the arc is <=360 degrees). In this case client application 112 may also generate and display a message informing the user of this, for example 'adjusting curvature to accommodate text length'.

Figure 10:
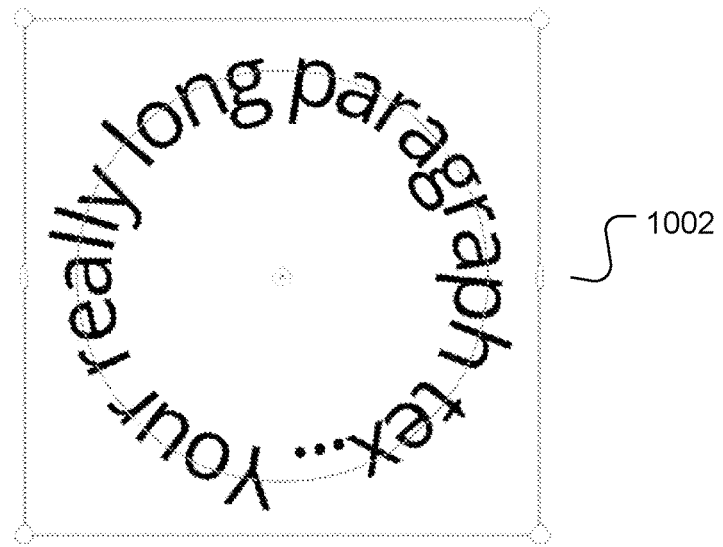

In still further embodiments, client application 112 is configured to truncate the text string so the remaining elements do not result in an arc that exceeds 360 degrees. This may involve, for example, removing elements from the end of the text string until the arc value is less than 360 degrees. In a variation of this embodiment, client application 112 may be configured to truncate the text string by removing elements until the remaining elements plus an additional, automatically added, truncation glyph (e.g. ' . . . ' or an alternative truncation glyph) results in an arc value of less than 360 degrees. In this case the truncation glyph shows the user that the text string is too long for the selected curvature. FIG. 10 provides an example of a linear text string 1002 which is too long for the selected curvature. In this case, the corresponding curved text element 1004 has been truncated and a truncation glyph '. . . ' added to the end of the remaining text string.

Further alternatives for handling a text string that is too long for the curvature are possible. For example, client application 112 may be configured to fade out the text as it nears 360 degree and not display any text that would fall over 360 degrees.

Once calculated, the values above are used to calculate the rotation, x-coordinate, and y-coordinate for the text string element.

In the present example, an initial rotation for a given element is calculated based on the element's position in the linear text string (i.e. the glyph offset value), the glyph width of the element, and the change in angle value δA:

$$\text{Initial rotation} = \delta A * (\text{glyph offset} + (\text{element glyph width}/2))$$

Initial rotation could be calculated without the "+(element glyph width/2))" term, however in this case the element's glyph would essentially be rotated about a corner (the left corner) rather than a midpoint of the glyph.

In order to make the text string an element belongs to appear as if curved about a top of a circle (e.g. an angular offset of 90 degrees), a final rotation is calculated by subtracting the calculated arc value divided by two from a character's initial rotation angle. For example, if the initial rotation calculated according to the equation above was 20 degrees, and the total arc of the string was 90 degrees, then 45 degrees (arc/2) would be subtracted from the calculated rotation to result in a final rotation of −25 degrees.

Where angular offset and/or flipped are provided as parameters, an additional angular offset would be added when calculating final rotation. For example, to make the text appear as if curved around the right hand side of a circle (e.g. per 506 of FIG. 5), 90 degrees would be added.

More generally, therefore, a text string element's final rotation can be calculated as:

Final rotation=(δ*A**(glyph offset+(element glyph width/2)))−arc/2+angular offset Using an element's final rotation, x and y coordinates can then be calculated:

x-coordinate=radius*cos(element final rotation)

y-coordinate=radius*sin(element final rotation)

At 712, once element transformations have been calculated for all elements, the client application 112 can render the curved text string. Client application 112 renders the curved text string by, for each text string element, rendering the glyph the element defines/is associated with based on the element transformation. In the present embodiment, and by way of example, client application 112 renders each element in its own HTML <span> container that has a CSS transform applied so as to position and rotate the glyph defined by the element as required by the rotation, x-coordinate, and y-coordinate of the element's transformation.

In order to apply the transformation, the element transformation's x-coordinate is added to the x-coordinate of the selected text string's midpoint.

If text is to have a positive curvature (i.e. appear as if curved around a top of a circle), the calculated radius is added to the y coordinate of the element's transformation.

If text is to have a negative curvature value (for example appear as if curved around a bottom of a circle) an alternative adjustment is made to the transformation's y coordinates. Specifically, the uppermost y-coordinate is determined (which for a negative curvature, will be the y coordinate of the first and last element) and subtracted from the y coordinate of the element's transformation.

Following 712, the input text string has been rendered as a curved text string. At this point a user may elect to keep the curved text string (e.g. by selecting a different element in the design or user interface control), reject the curved text string (e.g. by deactivating the curved text effect control 402 with the curved text string selected), or change the curved text string.

If relevant changes are made to the selected text string, its attributes, and/or the curved text parameters, some or all of the processing described above may be re-performed.

In the present embodiment, if a change may impact the splitting of the text string into elements is received (at 714) processing returns to 708 to re-split the text string. Such changes include, for example, a user changing the characters of the original text string (e.g. adding/removing characters) and/or changing the font of the original text string.

If a change is received (at 716) that does not impact the splitting of the text string elements by may impact the transformation of the text string elements (e.g. rotation and/or position), processing returns to 710 to recalculate element transformations before rendering the new curved text string. Such changes may include, for example, changes the font size of the original text string and/or adjustment of one or more curved text parameters at (e.g. curvature, angular offset, flipped).

While specific equations for calculating character rotation and position have been described above alternative equations may be possible.

Furthermore, the equation [δA=absolute $(c_m*2)*(16/f)$] presented above generally establishes a relationship between three variables: a curvature value ($c_i$ or $c_m$), a radius (via δA), and a font size. This (and the other equations described above) may be adapted to provide other curved text effects.

As one example, a 'semi-circle' control may be made available to a user (e.g. as a 'semi-circle' parameter control in an effect control interface such as 400) which, if selected, causes application 112 to display the selected text string in a semi-circle. To do this application 112 can use the formulas above and using the width of the selected text string, the radius (automatically determined as discussed below, based on a default curvature, or based on user-selected curvature), and a fixed arc angle of 180 degrees to calculate a font size that will result in the text string occupying a semi-circle.

In a similar fashion, controls allowing fixed arcs of other angles may be provided, for example a full circle control which, if selected, calculates a font size that causes the selected text string to occupy a full circle (arc angle=360 degrees). In addition, or alternatively, an arc angle selector control may be provided that allows a user to select any arc angle between 0 and 360 degrees and thereby cause the selected text string to occupy the selected arc. Such a control may be a slider control as described above.

To illustrate the operation of process 700, consider a selected text string of "Text", a curvature value of 1, and a font size of 16 px.

At 708, the text string elements are determined to be ["T", "e", "x", "t"] and to have corresponding widths of [9.9375, 8.09375, 8.3046875, 5.6640625].

The input to operation 710 (which may be performed by the transformation module 116) may be a dataset such as:

```
[
    // T
    {
        "characterMetrics": {
            "horizontalOffset": 0,
            "width": 9.9375
        },
        "lineMetrics": {
            "width": 32,
            "fontSize": 16
        }
    },
    // e
    {
        "characterMetrics": {
            "horizontalOffset": 9.9375,
            "width": 8.09375
        },
        "lineMetrics": {
            "width": 32,
            "fontSize": 16
        }
    },
    // x
    {
        "characterMetrics": {
            "horizontalOffset": 18.03125,
```

```
        "width": 8.3046875
      },
      "lineMetrics": {
        "width": 32,
        "fontSize": 16
      }
    }
  }
  // t
  {
    "characterMetrics": {
      "horizontalOffset": 26.3359375,
      "width": 5.6640625
    },
    "lineMetrics": {
      "width": 32,
      "fontSize": 16
    }
  }
]
```

Processing at 710 may then generate element transformations such as:

```
[
  // T
  {
    "transformations": [
      {
        "type": "translate",
        "x": -15.729406495080845,
        "y": "2.097751163723789px"
      },
      {
        "type": "rotate",
        "degrees": -22.0625
      }
    ]
  },
  // e
  {
    "transformations": [
      {
        "type": "translate",
        "x": -6.060837409902916,
        "y": "0.07087901513516215px"
      },
      {
        "type": "rotate",
        "degrees": -4.03125
      }
    ]
  },
  // x
  {
    "transformations": [
      {
        "type": "translate",
        "x": 1.983345692039217,
        "y": "0.6647715855119642px"
      },
      {
        "type": "rotate",
        "degrees": 12.3671875
      }
    ]
  },
  // t
  {
    "transformations": [
      {
        "type": "translate",
        "x": 9.871129621703888,
        "y": "2.973411817543319px"
      },
      {
        "type": "rotate",
        "degrees": 26.3359375
      }
```

```
      }
    ]
  }
]
```

At 712, these transformations may be used to generate HTML elements for rendering such as the following (in which properties unrelated to the curved text positioning, such as colour etc. have been omitted):

```
<span style="transform: translate(-15.7294px, 2.09775px)
rotate(-22.0625deg);">T</span>
<span style="transform: translate(-6.06084px, 0.070879px)
rotate(-4.03125deg);">e</span>
<span style="translate(1.98335px, 0.664772px)
rotate(12.3672deg);">x</span>
<span style="translate(9.87713px, 2.97341px)
rotate(26.3359deg);">t</span>
```

As mentioned above, in certain embodiments client application 112 may be configured to automatically calculate (or attempt to calculate) a suggested radius value for a text string based on the position of the text string in the design relative to other design elements.

Figure 11:
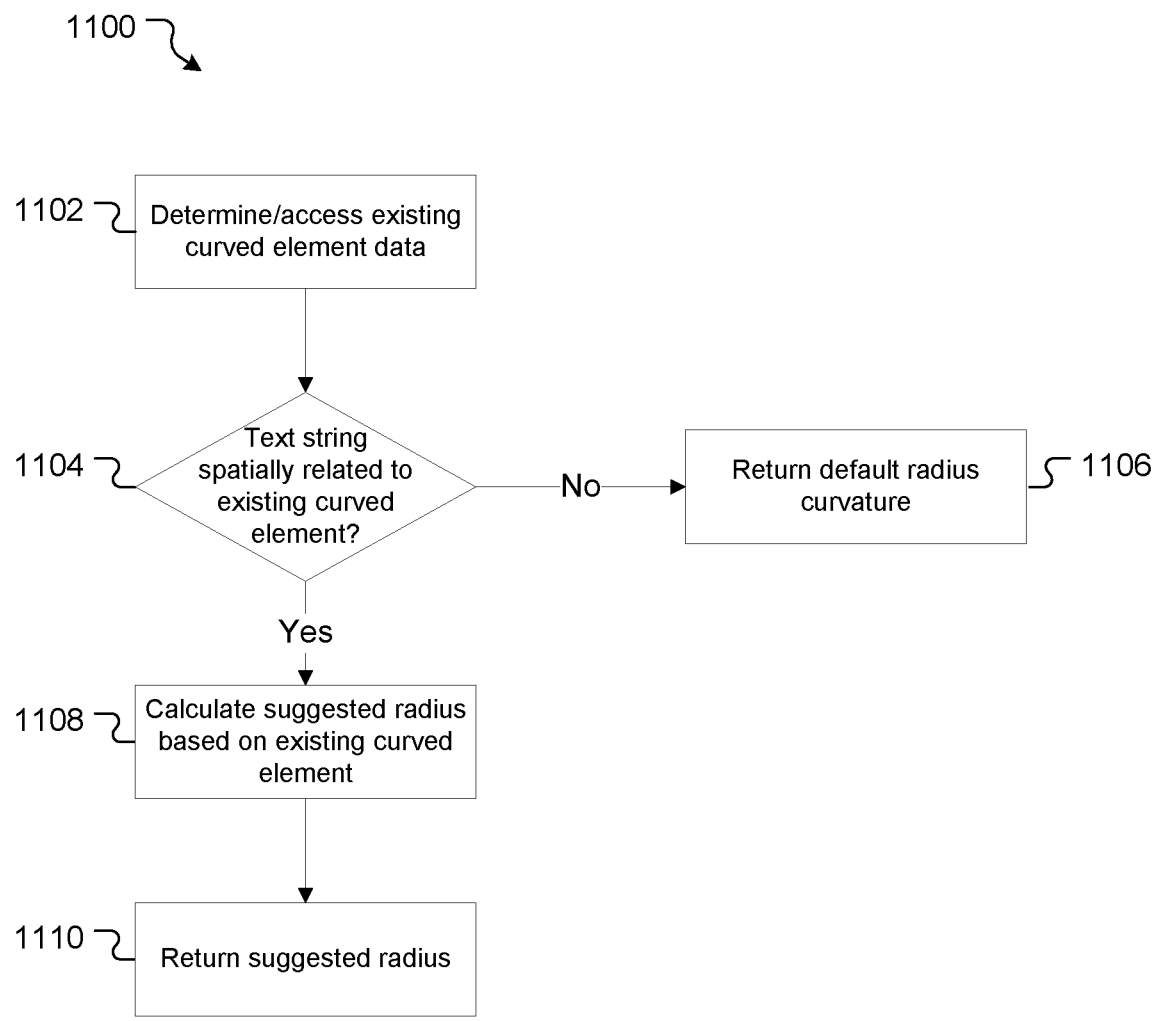
FIG. 11 is a flowchart depicting operations involved calculating a suggested radius.

FIG. 11 provides a flowchart indicating operations involved in a suggested radius value calculation process 1100. Process 1100 may be called, for example, as part of operation 706 (determining curved text parameters) described above.

In some embodiments, suggested radius calculation may be enabled/disabled by a user configurable application setting. If enabled, the suggested radius calculation process 1100 is automatically performed. Otherwise it is not (though may still be manually triggered by a user).

At 1102, existing curved element data is determined or accessed. The existing curved element data is data in respect of other curved design elements that are on the same design page as the selected text string.

Existing curved elements may be elements of defined types, for example elements that are circles (or approximately circles), elements that are or define arcs (e.g. semi-circles or other radial sections).

For an existing curved element, the existing curved element data may include position data and height data. The position data is data allowing the position of the existing curved element to be identified. By way of example, the position data for an existing curved element may be x and y coordinates defining an origin of the existing curved element. The height data is either the height of the existing curved element or data allowing a height of the existing curved element to be determined (e.g. a radius, a diameter, an element height, transformations such as warp/skew that may impact height, and/or other data allowing height to be determined).

The existing curved element data may be determined in various ways, and by client application 112 and/or server application 104.

Where a page includes vector design elements, the client application 112 or server application 104 may be configured may analyse page data to determine if any vector elements define a curved element of a defined type. For each vector element defining a curved element, the relevant data can then be accessed (or calculated) based on the element's vector definition. For example, in the SVG format a <circle> tag defines a circular vector element, and includes a 'cx' attribute (defining the x coordinate of the origin) a 'cy' attribute (defining the y coordinate of the origin), and a 'r' attribute (defining the radius).

Where a page includes raster design elements, the client application 112 or server application 104 may process the page (or raster elements thereon) to detect existing curved elements and extract/calculate curved element data. As one example, to detect existing curved elements that are circles a circle detection algorithm such as the Hough circle detection algorithm may be used. This algorithm may be adapted (and/or other algorithms used) to detect existing curved elements of other types (e.g. semi-circles, arcs, etc.). Processing raster data to detect curved elements will typically require more processing than processing vector elements. Accordingly, if raster elements are to be processed client application 112 may request a server application (such as 104) perform this processing and return the relevant data.

In certain embodiments determining existing curved element data at 1102 may be limited to determining existing curved vector element data only. In other embodiments 1102 may include determining existing curved raster element data only. In other embodiments 1102 may include both raster and vector elements.

When a design page is processed to determine existing curved element data results may be saved in an existing curved element dataset for future access. If additional elements are added to the page, however, the page may need to be reprocessed (or partially reprocessed) to keep the dataset current.

At 1104, client application 112 determines if the selected text string is spatially related to any of the existing curved elements determined at 1102.

In the present embodiment, whether a text string is spatially related to an existing curved element is determined based on alignment criteria and separation criteria.

In this example, the alignment criteria concerns vertical alignment. In this case, client application 112 determines the alignment criteria based on whether a horizontal midpoint of the text string (e.g. an x-coordinate of the middle or approximate middle of the text string) is vertically aligned with a horizontal midpoint of the existing curved element (e.g. an origin x-coordinate).

Client application 112 determines that a text string is vertically aligned with an existing curved element if a horizontal midpoint of the text string (e.g. an x-coordinate of the middle or approximate middle of the text string) is vertically aligned with a horizontal midpoint of the existing curved element (e.g. an origin x-coordinate). In determining vertical alignment client application 112 may take into account an alignment tolerance—e.g. if the horizontal midpoint of the text string is within (+ or −) the alignment tolerance of the horizontal midpoint of the existing curved element the client application 112 will determine they are vertically aligned.

Client application 112 determines the separation criteria based on whether a distance between the text string and existing element is within a defined separation distance.

The distance between the text string and the existing curved element may be calculated, for example, as the absolute value of a y-coordinate of the text string (e.g. a vertical midpoint or other y-coordinate of the text string) minus a y-coordinate of the existing element (e.g. the y-coordinate of the existing element's origin). Alternatively, distance may be calculated based on both x and y coordinates of the text string (e.g. a centre of the text string) and the existing element (e.g. the origin)—for example by using Pythagoras theorem (square root ((text string x−existing element x)$^2$+(text string y−existing element y)$^2$).

In the present embodiment, client application 112 determines the defined separation distance based on the size of the particular existing curved element in question—e.g. so that a relatively larger separation distance will be determined for larger existing elements while a relatively smaller separation distance will be determine for smaller existing elements. By way of specific example, the client application 112 may calculate the defined separation distance for a particular existing element by multiplying the existing element's radius (or height) as by a multiplier (e.g. 1.1, 1.2, 1.3 or an alternative multiplier).

If the text string is not spatially related to any existing curved element an automatic curvature value cannot be calculated. In this case client application 112 returns a default curvature value at 1106.

If client application 112 determines the text string is spatially related to an existing curved element (e.g. the alignment criteria and separation criteria are both met), processing proceeds to 1108.

At 1108, client application 112 calculates a suggested radius. The suggested radius is the distance between the text string and existing curved element (as determined above). Client application 112 may also map the calculated radius back to a curvature value (e.g. a value of between −100 and 100) so this can be displayed on a slider control or the like. This calculation can be performed by reversing the calculations described above.

At 1110 the suggested radius is then returned, and can be used as described above to calculate element transformations.

Figure 12:
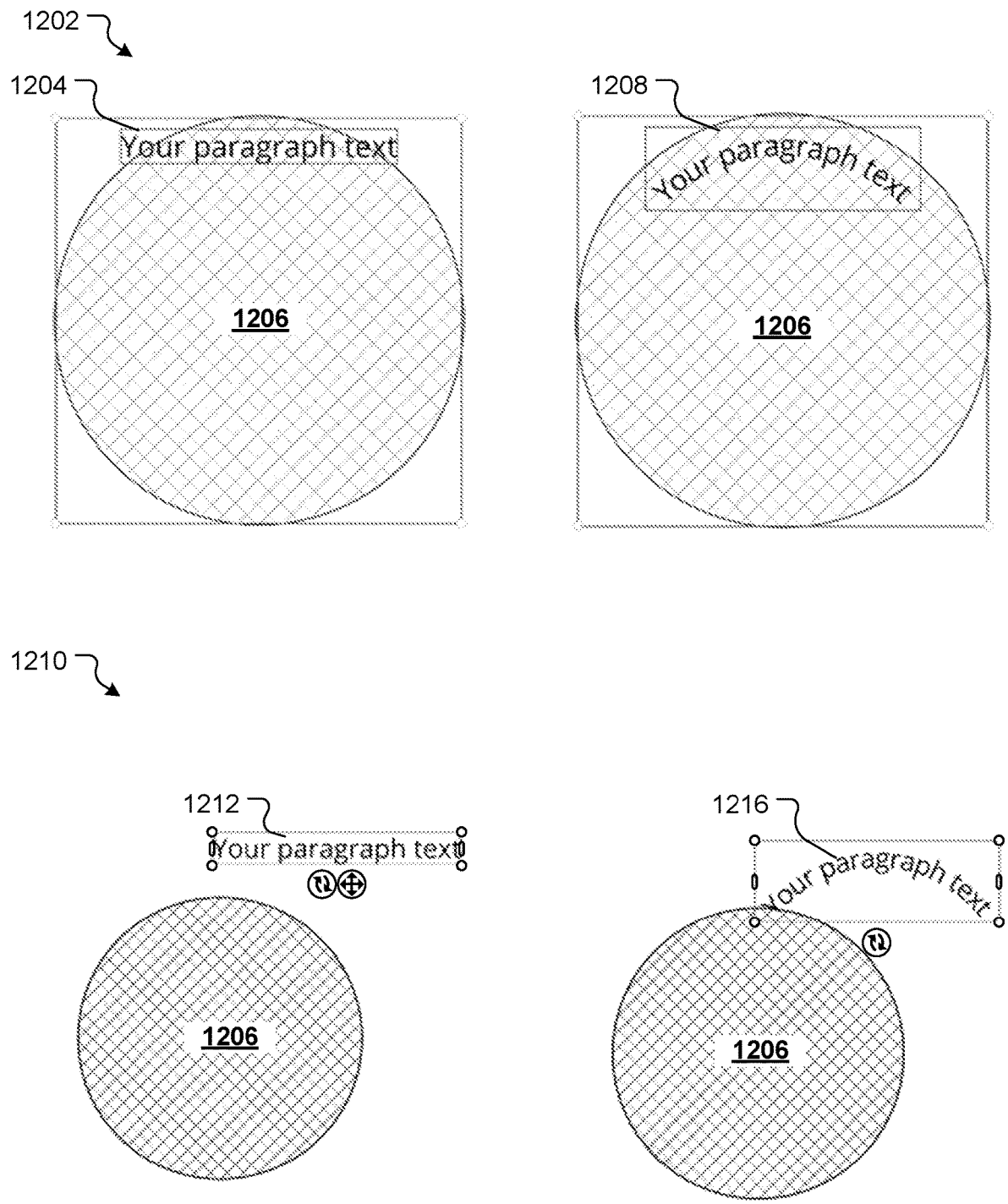
FIGS. 12 and 13 provide examples of curved text.

To illustrate operation of the suggested radius, consider the curved text elements and existing circular elements shown in FIG. 12.

In example 1202, text string 1204 ("Your paragraph text") is determined to be spatially related to existing curved element 1206. In this case client application 112 automatically calculates a suggested radius and displays the text string with the curved effect applied (1208).

In example 1210, text string 1202 ("Your paragraph text") is determined not to be spatially related to existing curved element 1214. In this case client application 112 uses a default curvature (that is unrelated to existing element 1214) to apply the text effect to the text string (1216).

Further illustrations of suggested radius are shown in FIG. 13. In the three examples of FIG. 13 (1302, 1304, and 1306) the selected text string 1308 is the same and the existing curved element 1310 is the same. The position of the selected text string 1308 relative to the existing curved element 1310 is, however, different in each example (though in all three examples the text string 1308 is determined to be spatially related to the existing curved element 1310). In example 1302, the selected text string 1308 is positioned within the existing curved element and as such a relatively small radius is suggested/used for the curved effect (see 1312). In example 1304, the selected text string 1308 is positioned at the top of the existing curved element and as such a larger radius is suggested/used for the curved effect (see 1314). In example 1306, the selected text string 1308 is positioned beyond the top of the existing curved element and as such a still larger radius is suggested/used for the curved effect (see 1316).

If, at 1104, client application client application 112 determines the text string is spatially related to multiple existing curved elements various approaches can be adopted.

In one approach, client application is configured to select one such existing element, for example the existing element that is closest to the foreground (based on a depth/z-index of the candidate elements); the existing element that the text string is closest to (based on distance); and/or based on other selection criteria.

In another approach, client application is configured to calculate and return suggested radii for all existing elements the text string is spatially related to. In this case client application 112 may use the suggested radii by, for example: displaying each curvature as a snap point so a user can easily select one of the suggested radii to see how the text string will appear with that curvature; displaying multiple text strings with the suggested radii applied and allowing the user to select one of the curved text strings (or reject all of them); or in alternative ways.

In further embodiments, application 112 may be configured to automatically determine whether a text string is in a spatial relationship with one or more existing curved elements as a user moves the text string around the design page (e.g. by dragging or other input). In this case application 112 dynamically determines whether the text string is spatially related to any existing curved element based on a current position of the text string that is selected/being moved (per 1104). If the current position results in the text string being spatially related to an existing curved element, application 112 then calculates a suggested radius (per 1108) and may automatically display the text string (or a further version thereof—e.g. a shadowed, partially transparent, or other version) based on the calculated curvature. This allows a user to move a text string around a design page and see it 'snapped' to curvatures calculated based on existing curved elements on the design page.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
    detecting initiation of a curved text effect in respect of a selected text string of a design;
    determining a radius;
    processing the selected text string to split the selected text string into one or more text string elements, each text string element being associated with a glyph;
    calculating, for each text string element, an element transformation that includes element rotation data and element position data, the element transformation being based on the radius; and
    rendering each text string element by, for a given text string element, rendering the glyph that the given text string element is associated with based on the element transformation calculated for the given text string element,
    wherein determining the radius includes automatically determining the radius based on an existing curved element of the design by:
        accessing curved element date in respect of existing curved elements in the design;
        determining, based on the curved element data, if the selected text string is spatially related to a particular existing curved element; and
        in response to determining that the selected text string is spatially related to the particular existing curved element, calculating the radius based on the curved element data associated with the particular existing curved element.

2. The computer implemented method of claim 1, wherein the radius is calculated based on a position of the selected text string relative to the particular existing curved element.

3. The computer implemented method of claim 1, wherein determining if the selected text string is spatially related to the particular existing curved element comprises:
    determining if the selected text string is aligned with the particular existing curved element.

4. The computer implemented method of claim 3, wherein determining if the selected text string is aligned with the particular existing curved element comprises determining if a horizontal midpoint of the selected text string is within an alignment tolerance of a horizontal midpoint of the particular existing curved element.

5. The computer implemented method of claim 3, wherein determining if the selected text string is spatially related to the particular existing curved element comprises:
    determining if the selected text string is within a defined separation distance of the particular existing curved element.

6. The computer implemented method of claim 5, wherein the defined separation distance is based on a size of the particular existing curved element.

7. The computer implemented method of claim 1, further comprising generating the curved element data by:
    processing the design to identify any existing curved vector elements included therein; and
    generating curved element data for each existing curved vector element identified.

8. The computer implemented method of claim 1, further comprising generating the curved element data by:
    processing the design to identify any existing curved raster elements included therein; and
    generating curved element data for each existing curved raster element identified.

9. The computer implemented method of claim 1, further comprising determining an angular offset, the angular offset defining a circumferential position, and wherein calculation of the element transformation for a given text string element is additionally based on the angular offset.

10. The computer implemented method of claim 1, wherein processing the selected text string to split the selected text string into one or more text string elements comprises processing the selected text string so that each text string element is a character or explicitly defined character group of the selected text string.

11. The computer implemented method of claim 1, wherein:
  processing the selected text string to split the selected text string into one or more text string elements comprises processing the selected text string using a text shaping library; and
  at least one text string element includes multiple characters from the selected text string that were not an explicitly defined character group of the selected text.

12. A computer processing system comprising:
  a processing unit;
  a display; and
  a non-transitory computer-readable storage medium storing instructions, which when executed by the processing unit, cause the processing unit to:
    detect initiation of a curved text effect in respect of a selected text string of a design;
    determine a radius;
    process the selected text string to split the selected text string into one or more text string elements, each text string element being associated with a glyph;
    calculate, for each text string element, an element transformation that includes element rotation data and element position data, the element transformation being based on the radius; and
    render, on the display, each text string element by, for a given text string element, rendering the glyph that the given text string element is associated with based on the element transformation calculated for the given text string element,
  wherein determining the radius includes automatically determining the radius based on an existing curved element of the design by:
    accessing curved element data in respect in existing curved element in the design;
    determining, based on the curved element data, if the selected text string is spatially related to a particular existing curved element; and
    in response to determining that the selected text string is spatially related to the particular existing curved element, calculating the radius based on the curved element data associated with the particular existing curved element.

13. The computer processing system of claim 12, wherein the radius is calculated based on a position of the selected text string relative to the particular existing curved element.

14. The computer processing system of claim 12, wherein determining if the selected text string is spatially related to the particular existing curved element comprises:
  determining if the selected text string is aligned with the particular existing curved element.

15. The computer processing system of claim 12, wherein execution of the instructions further causes the processing unit to determine an angular offset, the angular offset defining a circumferential position, and wherein calculation of the element transformation for a given text string element is additionally based on the angular offset.

16. The computer processing system of claim 12, wherein:
  processing the selected text string to split the selected text string into one or more text string elements comprises processing the selected text string using a text shaping library; and
  at least one text string element includes multiple characters from the selected text string that were not an explicitly defined character group of the selected text.

17. The computer processing system of claim 12, wherein determining if the selected text string is aligned with the particular existing curved element comprises determining if a horizontal midpoint of the selected text string is within an alignment tolerance of a horizontal midpoint of the particular existing curved element.

18. The computer implemented method of claim 12, wherein determining if the selected text string is spatially related to the particular existing curved element comprises:
  determining if the selected text string is within a defined separation distance of the particular existing curved element.

19. The computer processing system of claim 18, wherein the defined separation distance is based on a size of the particular existing curved element.

* * * * *